US007873355B2

(12) United States Patent
Graefen

(10) Patent No.: US 7,873,355 B2
(45) Date of Patent: *Jan. 18, 2011

(54) PROFILE-DRIVEN RESPONSE TO COMMUNICATION EVENTS

(75) Inventor: Eddy A Graefen, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/637,860

(22) Filed: Dec. 15, 2009

(65) Prior Publication Data

US 2010/0093322 A1 Apr. 15, 2010

Related U.S. Application Data

(63) Continuation of application No. 10/281,651, filed on Oct. 28, 2002, now Pat. No. 7,653,380.

(51) Int. Cl.
*H04Q 3/42* (2006.01)

(52) U.S. Cl. .................... 455/414.1; 455/412.12; 455/412.2; 455/413

(58) Field of Classification Search .............. 455/414.1, 455/412.1, 412.2, 413, 466, 461, 566, 567, 455/565, 550, 564, 451, 404.2, 575, 500; 379/88.22, 67.1, 201.02, 211.02, 200, 67, 379/88
See application file for complete search history.

(56) References Cited

U.S. PATENT DOCUMENTS

| 5,430,793 | A  | * | 7/1995  | Ueltzen et al. ........... 379/93.29 |
| 6,781,972 | B1 | * | 8/2004  | Anderlind et al. ........... 370/329 |
| 7,653,380 | B2 | * | 1/2010  | Graefen ................... 455/414.1 |
| 2002/0077086 | A1 | * | 6/2002  | Tuomela et al. ............. 455/414 |
| 2003/0043974 | A1 | * | 3/2003  | Emerson, III ............ 379/88.13 |
| 2004/0198427 | A1 | * | 10/2004 | Kimbell et al. .......... 455/556.1 |
| 2005/0020249 | A1 | * | 1/2005  | Seo ......................... 455/414.1 |
| 2008/0065461 | A1 | * | 3/2008  | Doss et al. ..................... 705/9 |

* cited by examiner

*Primary Examiner*—Tan Trinh
(74) *Attorney, Agent, or Firm*—Moazzam & Associates, LLC

(57) ABSTRACT

A method includes storing a setting in a profile of a wireless device to cause an automatic message response to incoming calls. When the profile is set as the active profile and an incoming call is received, an automatic response is provided to the incoming call in accordance with the setting.

20 Claims, 8 Drawing Sheets

Ring 104
    Ring once
Ring tone 106
    Bee
Ring volume 108
    1
Vibrate 110
    No
New message tone 112
    Mosquito
Respond with message 114
    Yes
Response message 116
    I'm in a meeting right now. Please call back.
Response message format 117
    SMS
Respond according to date/time 118
    No
Respond according to location 120
    No
Respond according to caller id 122
    No

PROFILE-DRIVEN RESPONSE TO COMMUNICATION EVENTS

This application is a continuation of U.S. patent application Ser. No. 10/281,651, filed Oct. 28, 2002, now U.S. Pat. No. 7,653,380, the content of which is incorporated by reference herein in its entirety.

FIELD

The invention relates to communications, and, more particularly, to automatic response to communication events.

BACKGROUND

Wireless telephones are popular, ubiquitous devices. It is now possible to make and receive phone calls from almost any place in the world. Communication is even possible from remote and undeveloped areas using wireless satellite telephones. Herein, the term wireless telephone refers to any device capable of transmitting and receiving voice and/or data (non-voice) information to and from a network without the use of wires, cables, or other tangible transmission media. So called cellular telephones are a common example of wireless phones.

Wireless telephones and the networks by which they communicate include analog mobile phone service (AMPS), and so-called second generation (2G) and third-generation (3G) devices that operate according to various communication technologies, including circuit switching, packet switching, wireless local area network (LAN) protocols, code division multiple access (CDMA), time division multiple access (TDMA), frequency-division multiplexing (FDM), spread-spectrum, global system for mobile communications (GSM), high-speed circuit-switched data (HCSD), general packet radio system (GPRS), enhanced data GSM environment (EDGE), and universal mobile telecommunications service (UMTS). Of course, these are only examples, and other technologies may be employed in wireless communication as well.

Herein, the term 'wireless device' is meant to include wireless telephones (including cellular, mobile, and satellite telephones), and also to include a variety of other wireless devices, including wireless web-access telephones, automobile, laptop, and desktop computers that communicate wirelessly, and wireless personal digital assistants (PDAs). In general, the term 'wireless device' refers to any device with wireless communication capabilities.

Many companies produce wireless telephones and other wireless devices. Among the more well-known producers are Nokia®, Ericsson®, Motorola®, Panasonic®, Palm® Computer, and Handspring®. A variety of producers also provide wireless devices comprising versions of the Microsoft® Windows® operating software.

Along with the ubiquity of wireless telephones come drawbacks. One drawback is that public and private places are now prone to interruption by incoming calls to wireless phones. In certain places, such as movie theatres and meeting rooms, such interruptions may be unwelcome.

One solution to this problem is described in U.S. patent application Ser. No. 10/140,135, entitled System and Method for Providing an Automatic Response to a Telephone Call. A voice or text response is sent to the caller without requiring the user of the telephone to answer the call. The user may perform an action (such as pressing a button on the telephone) to initiate response, or the telephone and/or network may automatically (without user intervention) initiate response.

Modern wireless telephones may be configured with profiles to control the behavior of the telephone in different situations. As used herein, the term "profile" refers to data, stored in an electronic memory of the telephone, telephone peripheral device, or the network, which may be accessed to determine the behavior of a wireless telephone. One or more profiles may be available for the phone, such as Normal, Silent, and Meeting. The 'active' profile is the profile selected from among the available profiles to control the phone's behavior. For example, a Meeting profile may include settings to control the manner in which a telephone behaves upon receiving an incoming call (vibrate or ring, ring tone, number of rings before going to voice mail, etc.). When the "Meeting" profile is selected, the phone may vibrate instead of ringing upon receiving an incoming call, and may go to voice mail after a single ring.

Profiles are convenient, effective, and well understood by the users of wireless telephones. The response of wireless phones to incoming calls or other communication events could thus benefit from the expanded use of profiles.

SUMMARY

In one embodiment, a profile of a wireless device includes a setting to cause an automatic message response to incoming calls. When the profile is set as the active profile and an incoming call is received, an automatic response is provided to the incoming call in accordance with the setting.

In another embodiment, a wireless device is used to select an active profile. In response to selection of the active profile, signaling occurs between the wireless device and a network by which the wireless device communicates. The network is configured according to at least one setting of the active profile to automatically provide a response message to callers of the wireless device.

In another embodiment, a wireless communication network includes functionality to provide at least one of SMS, EMS, and MMS messages. The network includes at least one setting for a wireless device that communicates by way of the network. The setting causes the network to automatically respond to callers of the wireless device with a response message. The network includes logic to alter the setting in accordance with changes to an active profile of the wireless device.

FIGURES

The invention may be better understood with reference to the following figures in light of the accompanying description. The present invention, however, is limited only by the scope of the claims at the concluding portion of the specification.

FIG. 1 is a block diagram of an embodiment of a profile.

DESCRIPTION

Figure 2:
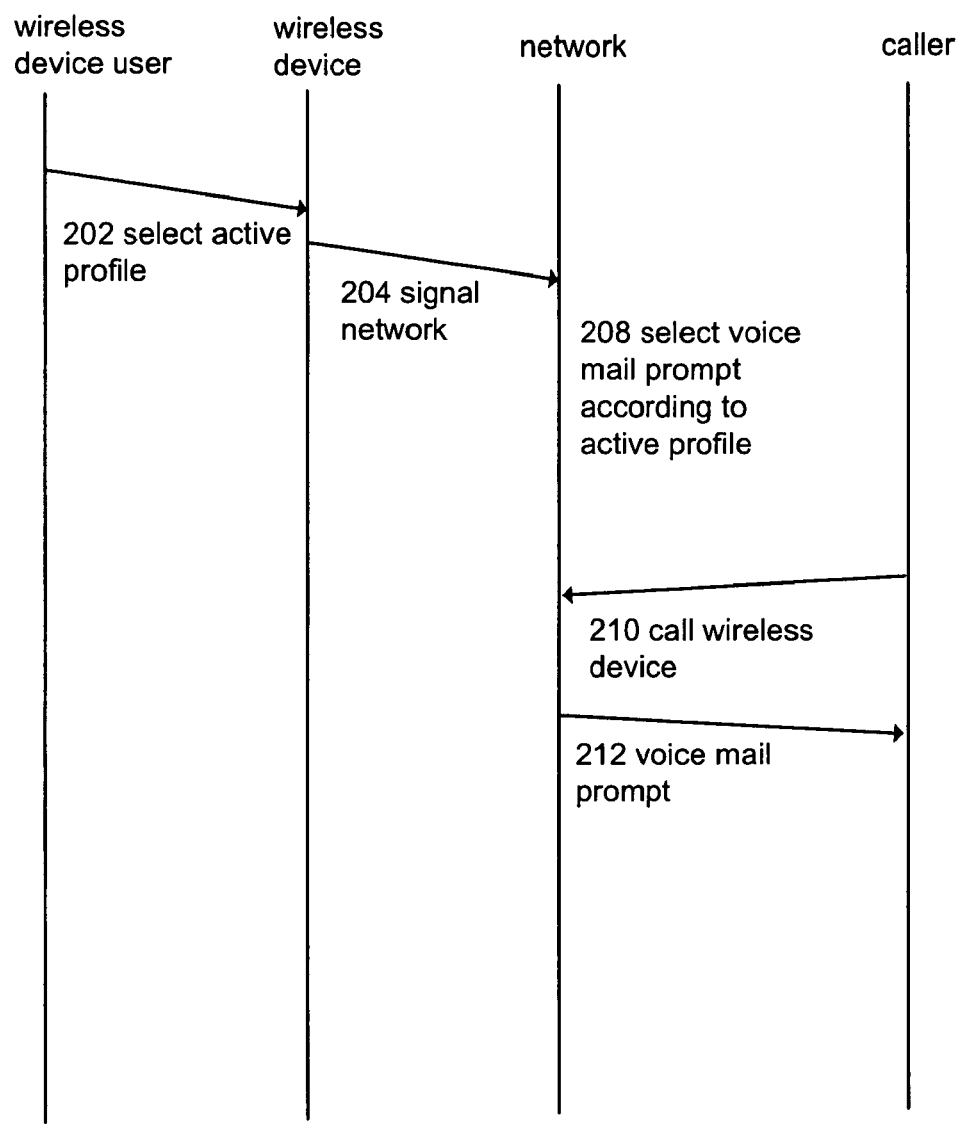
FIG. 2 is a diagram illustrating an embodiment of a method of configuring the response of a wireless device to incoming calls.

In the following description, numerous references to "one embodiment" or "an embodiment" do not necessarily refer to the same embodiment, although they may. In the figures, like numbers refer to like elements.

FIG. 1 is a block diagram illustrating an embodiment of a profile 102. The profile 102 may be stored in the memory of a wireless device, and/or in a memory of the network by which the wireless device communicates. The profile includes settings to control the manner in which the device responds to incoming calls. A setting is any information relating to the device. For example, settings may include ring options 104 such as silent, ring once, and beep once. Settings may also include the ring tone 106, such as ring-ring, low, 'mosquito', 'bee', 'city bird', and other popular tones or tunes. Settings may also include the ring volume 108, whether the device should vibrate or not 110 and the tone 112 to use to alert to the presence of new messages. Of course, additional and/or different settings are possible in other embodiments.

The profile may further comprise settings to determine the response behavior to incoming calls. One setting 114 may determine whether to automatically respond to incoming calls with a message. Another setting 116 may determine a particular message to respond with. Yet another setting 117 may determine the technique for communicating the response message.

The profile may comprise a setting 118 to determine whether to respond with a particular message depending upon the date and/or time of day. An electronic calendar may be applied to facilitate this process. Another setting 120 may determine whether to respond with a particular message depending upon the location of the device. Again, a calendar may be applied to facilitate this process.

Another setting 122 may determine whether to respond with a particular message according to the caller's identity. An address book/contact list may be applied to facilitate this process.

The profile embodiment 102 of FIG. 1 defines the phone's response behavior to incoming calls as follows: ring once at low volume (volume level=1) with the 'bee' tone, don't vibrate, and automatically respond to the caller with the message "I'm in a meeting right now. Please call back." The messaging technique is Short Messaging Service (SMS). The message is always the same and is not specific to the time, date, or location of the phone, nor is the message specific to the caller's id.

SMS, otherwise known as text messaging, mobile messaging, or alphanumeric paging, allows for the communication of short text and numeric messages to and from wireless devices, as well as to and from public SMS messaging gateways on the Internet. A detailed description of SMS is available as part of the GSM standard.

Another messaging technique that may be specified in the profile is Enhanced Messaging Service (EMS). EMS supports the capabilities of SMS to communicate short text and numeric messages, but also includes capabilities for the communication of other types' of data, including sound, animation, graphics, and additional text-formatting capabilities. Yet another messaging technique that may be specified in the profile is Multimedia Messaging Service (MMS). MMS provides for the communication of video and other advanced multimedia formats.

The user of the device may select an active profile from among the phone's profiles, and by doing so may determine the phone's (or the network's) response behavior to incoming calls. Profiles may be named, and in one embodiment the user may select the active profile from among available profiles using the keypad and display. Common names for profiles include Normal, Silent, Meeting, Outdoor, and Pager.

The response message may be automatically transmitted by the wireless device, or by the network by which the wireless device communicates. For example, a wireless phone may automatically respond to incoming calls with the SMS message "I'm in a meeting right now. Please call back." (refer to the discussion of FIG. 1). Alternatively, the network may intercept the incoming call to the phone and provide the response message to the caller. Thus, in the preceding example, the SMS message may be transmitted to the caller by the network without ever alerting the phone of the incoming call. Selection of an active profile may thus result in the reconfiguration of a network setting, thus affecting the response message to the caller. As another example, selection of an active profile may select the voice mail prompt that a caller hears when the call goes to voice mail.

The caller's id (for example, their phone number and/or IP address) may be recorded in a call log or other record, so that the called party is aware of who called and when, and may return the call at a convenient time.

FIG. 2 is a diagram illustrating an embodiment of a method of configuring the response of a wireless device to incoming calls. The selection of an active profile at 202 results in an exchange of signals at 204 between the wireless device and the devices of the network over which the wireless device communicates. At 206 the voice mail response to incoming calls to the wireless device is selected according to the active profile. For example, changing the currently active profile from "Silent" to "Meeting" may result in signaling between the wireless device and the network, such that at 208 the voice mail response that callers hear is changed from "I am unavailable. Please call back later", to "I can't take your call right now because I'm in a meeting." A call at 210 to the wireless device results in transmission of the voice mail response to the caller at 212.

Alterations to the settings of the active profile (henceforth, "profile settings") may also result in an exchange of signals between the wireless device and the devices of the network over which the wireless device communicates. Such exchange of signals may affect at least one setting of the network (henceforth, "network settings"). The network may comprise logic to affect one or more network settings for the wireless device in accordance with changes to active profile settings of the wireless device. Such logic may comprise any set of instruction signals and/or data applied to control processes of the network. Network logic may be embodied in software, hardware, firmware, and/or combinations thereof.

Figure 3:
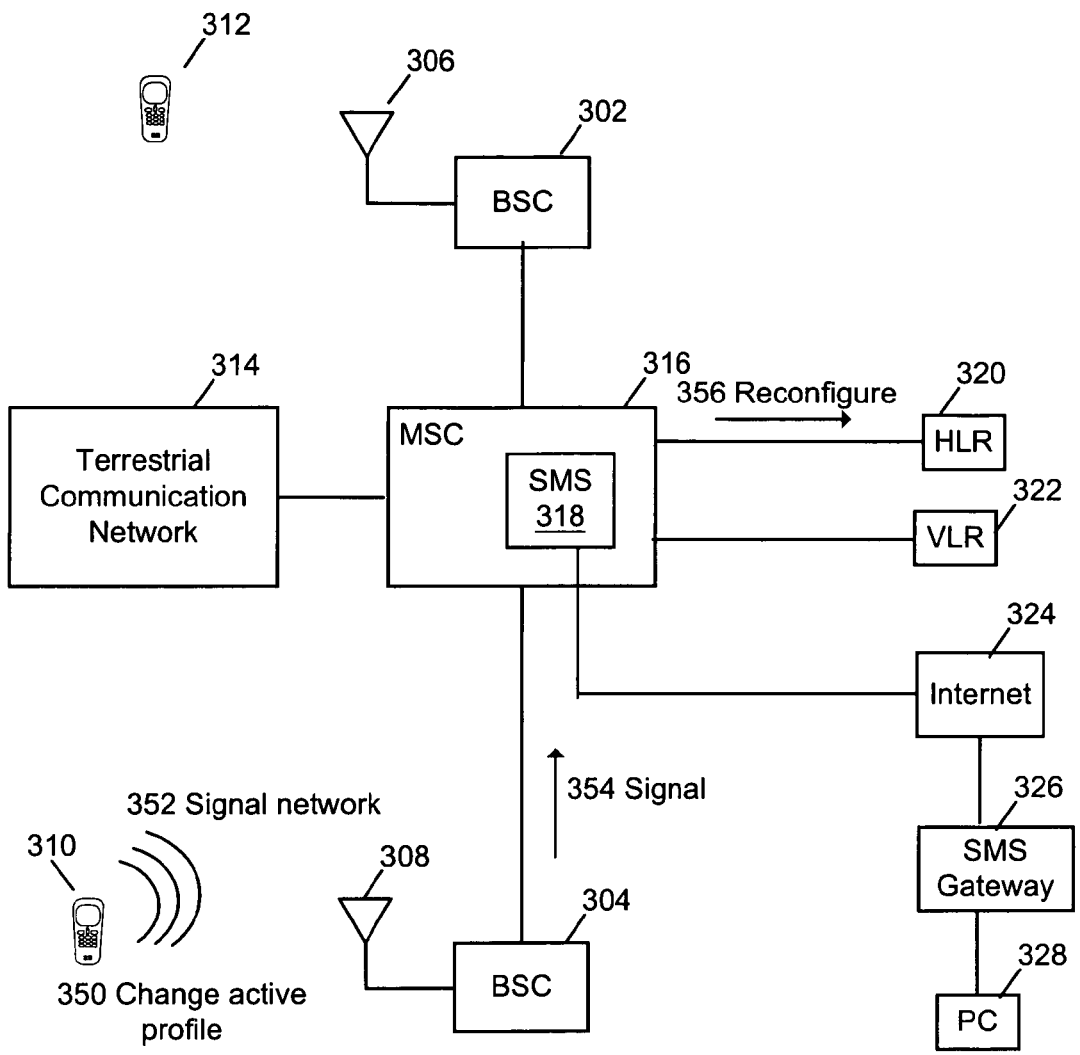
FIG. 3 is a block diagram of a network embodiment including acts of a method embodiment to reconfigure network settings.

FIG. 3 is a block diagram of a network including acts of a method to reconfigure network settings. The network and the acts illustrated are merely possible embodiments. Base station controllers (BSC) 302, 304 include antennae 306, 308 respectively to receive signals from wireless devices 312, 310. The BSCs 302, 304 are coupled to a mobile switching center (MSC) 316 network element that is responsible, among other things, for routing calls to their appropriate destination. Herein, the term "network element" refers to any one or more devices of a communication network. The MSC 316 is coupled to a terrestrial (non-wireless) communication network 314 to enable communication with wired devices such as home and business telephones. The MSC 316 comprises Simple Message System (SMS) functionality 318 to route SMS messages between mobile devices. SMS messages may also be communicated to and from a personal computer (PC) 328 or other Internet-coupled device via an SMS gateway 326 to the Internet 324. In other embodiments, EMS and/or MMS functionality could replace or supplement the SMS functionality 318. Not shown for clarity of explanation, but understood by those skilled in the art, are other components included in a typical MSC 316, such as a processor, memory, and various input/output devices.

A Home Location Registry (HLR) 320 stores network settings associated with the wireless device 310 and that determine the response to incoming calls to the wireless device 310. If the wireless device 310 is roaming on the network, such network settings may be stored in a Visitor Location Registry (VLR) 322.

In one embodiment, a new active profile is selected for the wireless device 310 at 350, resulting in a wireless signal to the network at 352. At 354 the BSC 304 converts the wireless signal to a signal to the MSC 316. As a result, a reconfiguration of network settings takes place at 356 (possibly, as shown, by changing settings in the HLR 320 for the wireless device 310).

Figure 4:
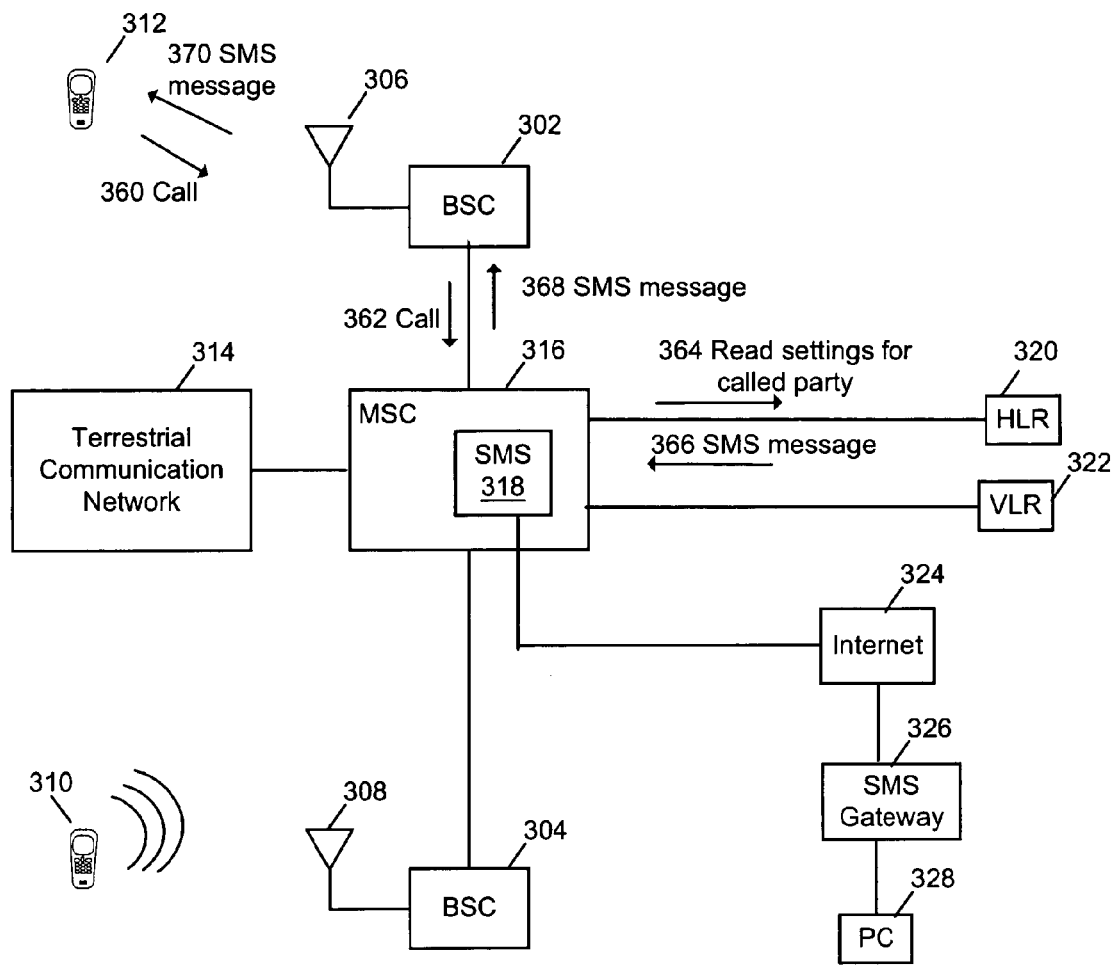
FIG. 4 is a block diagram of a network embodiment including acts of a method embodiment to respond to an incoming call.

FIG. 4 is a block diagram of a network including acts of a method to respond to an incoming call. Again, the network and the acts illustrated are merely possible embodiments. At 360 the first wireless device 312 initiates a call to a second wireless device 310. The BSC 302 receives the call at 362 and forwards it to the MSC 316. At 364 the MSC 316 reads the settings for the called party (device 310) from the HLR 320 and determines that a message should be automatically returned to the caller 312 in response to the call. The messaging technique could be voice mail, SMS, EMS, MMS, or some other technique. At 366 the message is returned from the HLR 320. At 368 the message is passed to the BSC 302. At 370 the message is communicated wirelessly to the caller 312.

The response message may comprise information to the caller about how to leave a message for the called party. For example, the response message could say, "I'm in a meeting at the moment. Please press one to leave a voice mail."

When the caller is an Internet-coupled device, the response message may at some point in the communication process be converted to an Internet-compatible format, such as into an email or instant message (IM).

Figure 5:
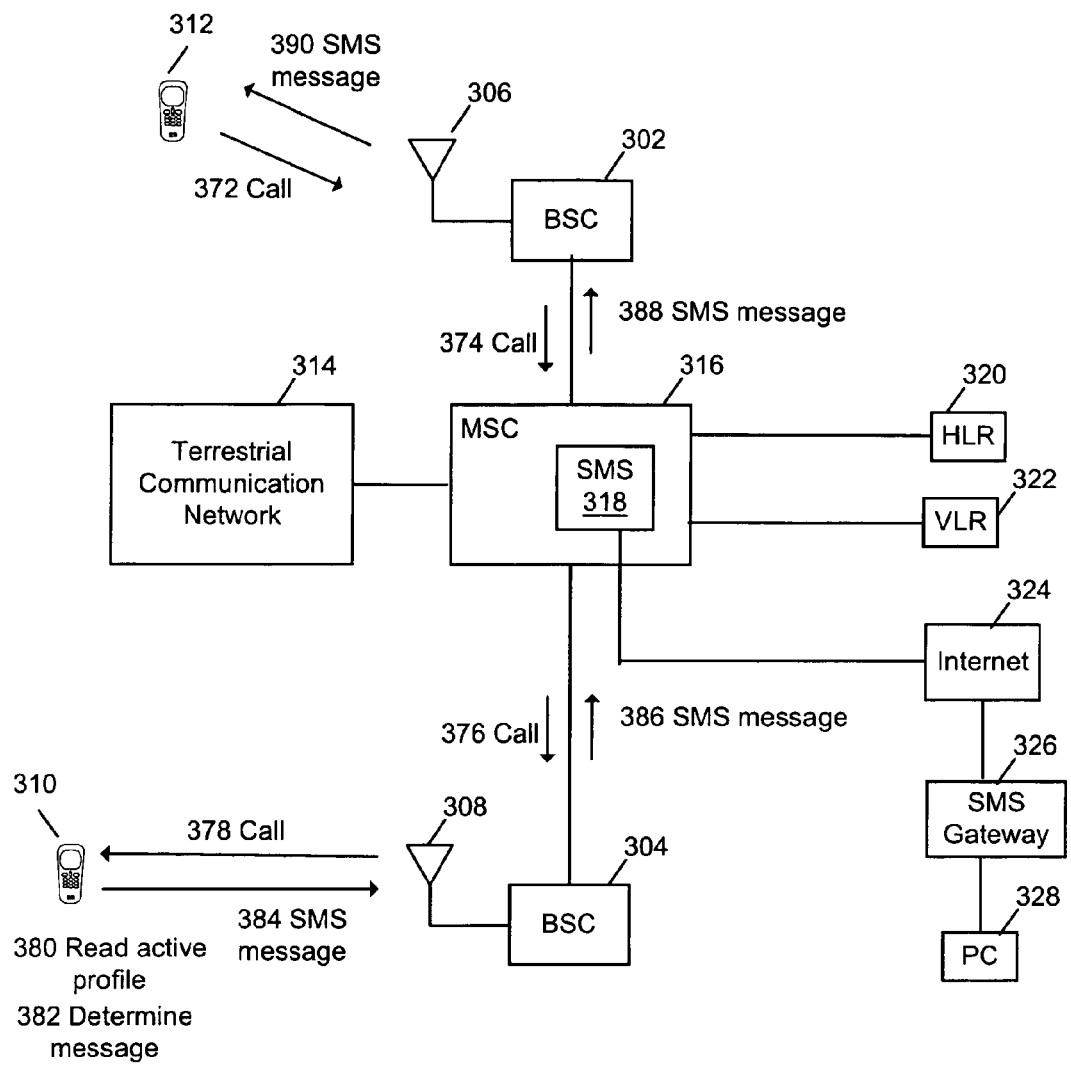
FIG. 5 is a block diagram of a network embodiment including acts of a method embodiment to respond to an incoming call.

FIG. 5 is a block diagram of a network including acts of a method to respond to an incoming call. Again, the network and the acts illustrated are merely possible embodiments. At 372 the first wireless device 312 initiates a call to a second wireless device 310. The BSC 302 receives the call at 374 and forwards it to the MSC 316. At 376 the MSC 316 routes the call to the appropriate BSC 304 for the second wireless device 310. At 378 the incoming call is transmitted to the second wireless device 310. The active profile of the device 310 is read at 380, and an automatic response message is determined at 382 according to the active profile. In one embodiment, the response is an SMS message. The response technique could also be EMS, MMS, voice, or other technique. At 384-390, the message is communicated to the BSC 304, through the MSC 316, to the BSC 302, and finally to the caller 312.

Figure 6:
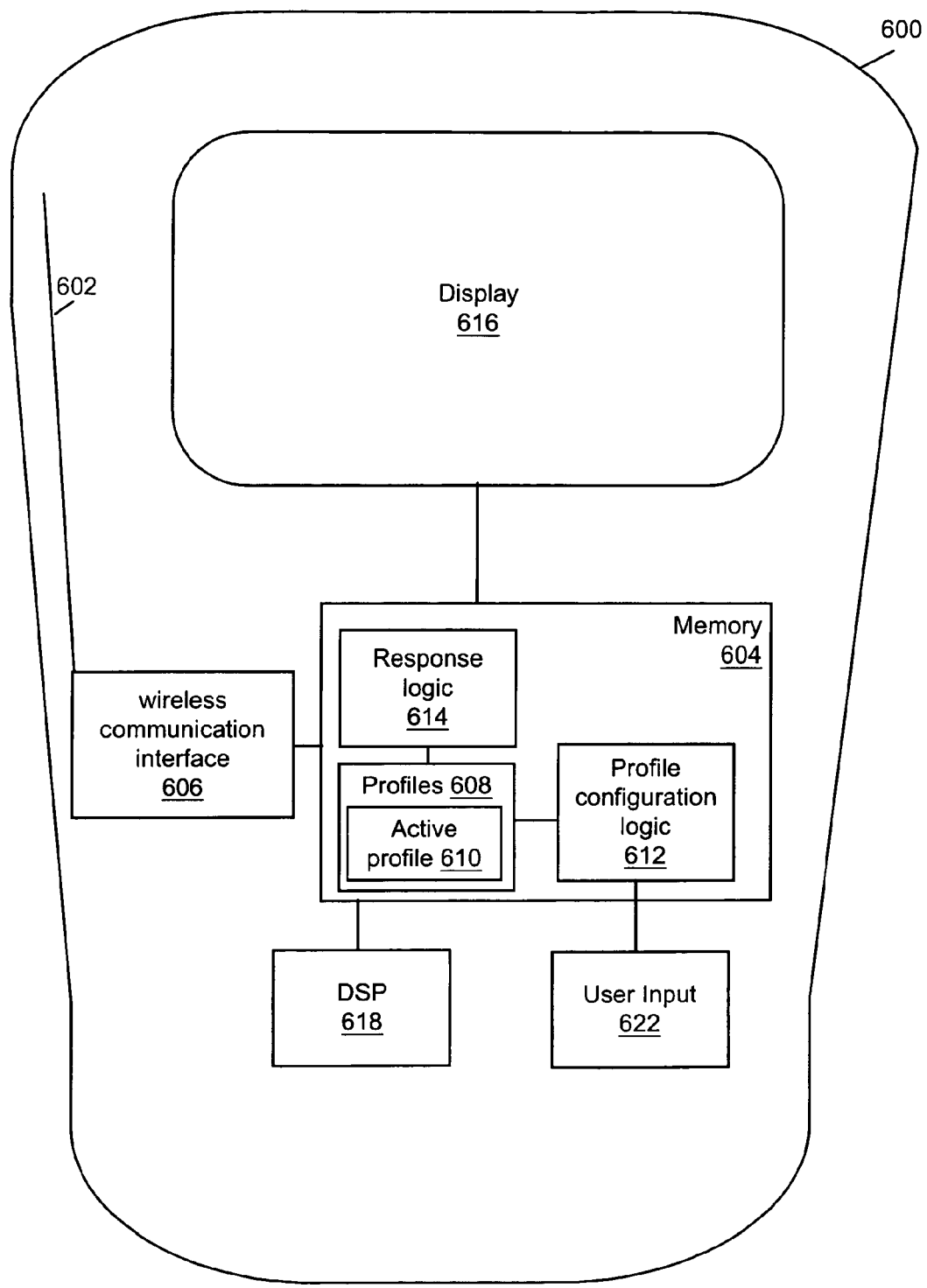
FIG. 6 is a block diagram of an embodiment of a wireless telephone.

FIG. 6 is a block diagram of an embodiment 600 of a wireless telephone. A wireless communication interface 606 is coupled to a memory 604 and a digital signal processor (DSP) 618. The wireless communication interface 606 converts signals of the DSP 618 and/or the memory 604 into wireless signals that may be transmitted via the antennae 602. Numerous other well-known elements of the telephone embodiment 600 have been omitted for clarity.

The memory 604 comprises a plurality of profiles 608, including an active profile 610. The memory 604 further comprises profile configuration logic 612 to affect the settings of the profiles 608, and response logic 614 to read the settings of the active profile 610 and respond to incoming calls accordingly. Profile configuration logic 612 and response logic 614 may comprise any set of instruction signals and/or data that may be applied to/processed by the DSP 618 or other processor of the telephone 600. Profile configuration logic 612 and response logic 614 may be embodied in software, hardware, firmware, and/or combinations thereof. The response logic 614 may provide for response by way of one of SMS, EMS, and MMS.

A display 616 may be employed to display the settings of the profiles 608 so that a user of the telephone 600 may read or change the settings of the profiles 608. An input device 622 such as a keypad, buttons, touchpad, or voice recognition interface allows the user to input and/or select profile settings and select an active profile. In one embodiment, the input device 622 may be integral with the display 616 (e.g. touch or pressure-sensitive screen).

Figure 7:
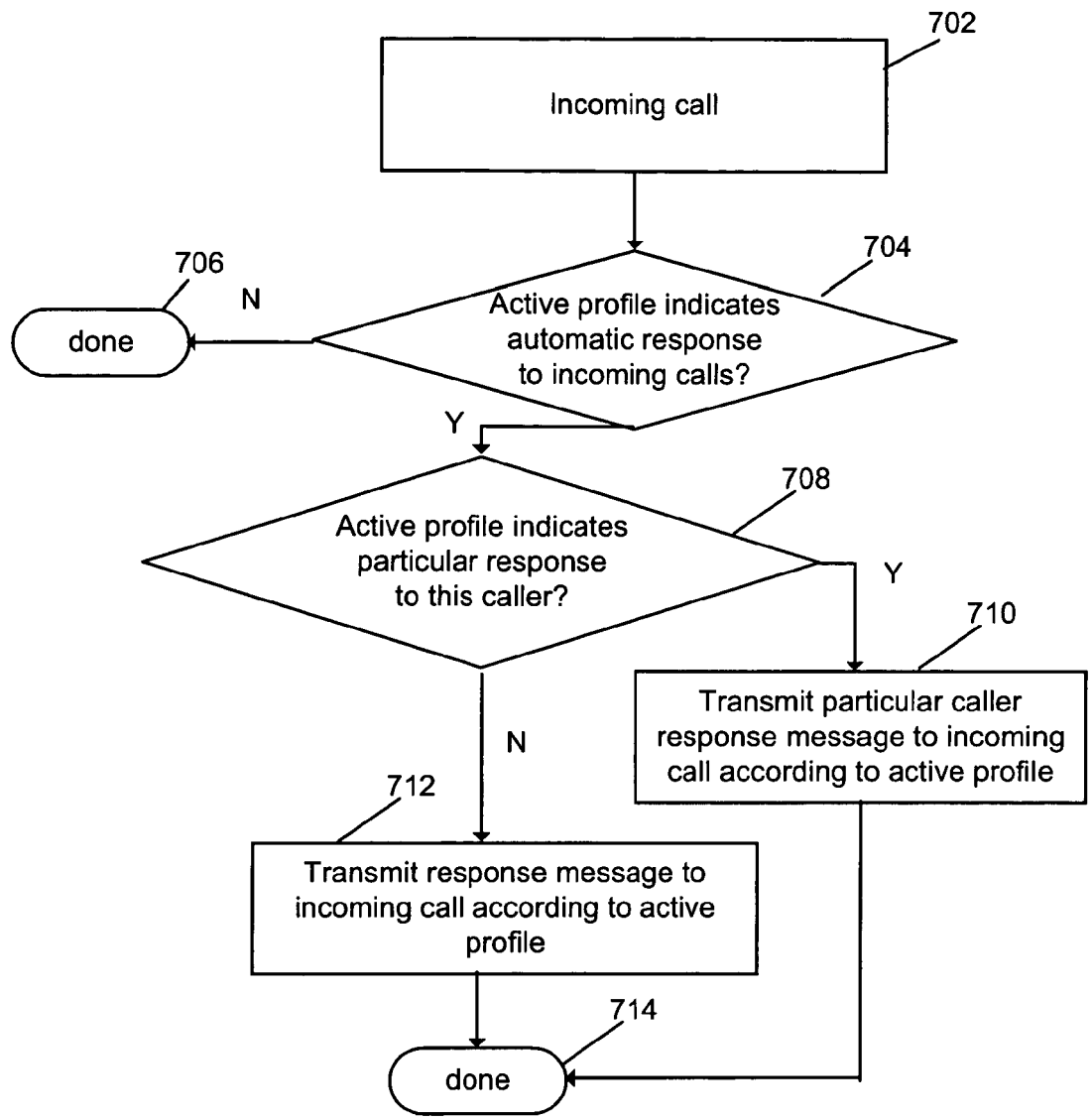
FIG. 7 is a flow chart of an embodiment of a method to automatically respond to incoming calls.

FIG. 7 is a flow chart of an embodiment of a method to automatically respond to incoming calls. At 702 an incoming call event occurs. At 704 it is determined whether the active profile indicates an automatic response to incoming calls. If not, the method concludes at 706. Otherwise, a check is made at 708 as to whether the active profile indicates a particular response message for this caller. If so, the message for the particular caller is transmitted to the caller at 710. If not, a general message is transmitted to the caller at 712. In various embodiments, the messaging technique is SMS, EMS, MMS, and/or voice.

An electronic contact list and/or address book may be employed to facilitate response with a caller-specific message. For example, in one embodiment the caller's id (for example their telephone number and/or IP address) may be applied to locate an entry in an electronic address book or contact list. The entry may comprise the response message to apply for the particular caller.

Figure 8:
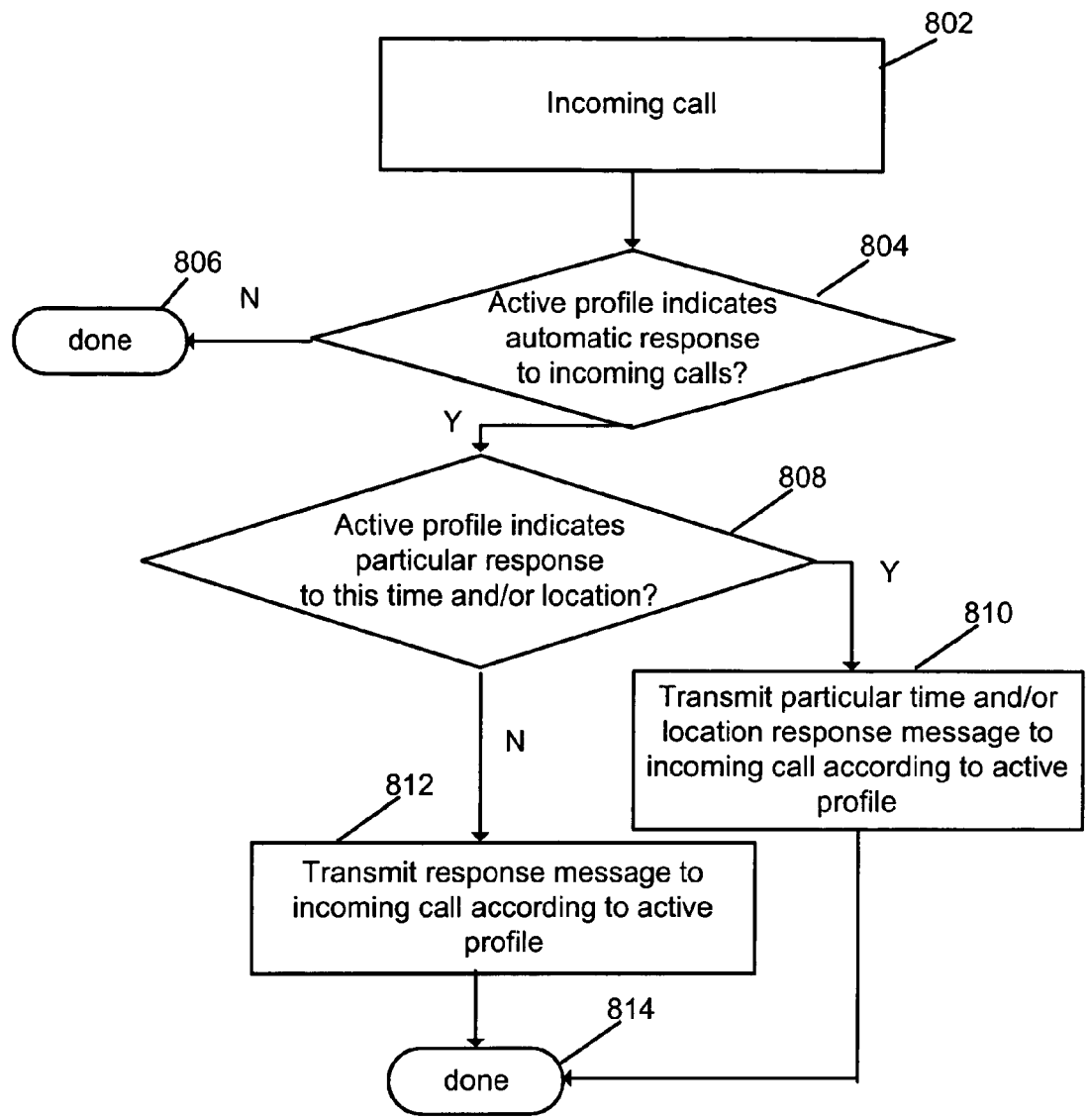
FIG. 8 is a flow chart of an embodiment of a method to automatically respond to incoming calls.

FIG. 8 is a flow chart of an embodiment of a method to automatically respond to incoming calls. At 802 an incoming call event occurs. At 804 it is determined whether the active profile indicates an automatic response to incoming calls. If not, the method concludes at 806. Otherwise, a check is made at 808 as to whether the active profile indicates a particular response message for the particular time of day and/or location. If so, the message for the particular time of day and/or location is transmitted to the caller at 810. If not, a general message is transmitted to the caller at 812. Again, in various embodiments, the messaging technique is SMS, EMS, MMS, and/or voice. An electronic calendar may be employed to facilitate response with a date/time/location-specific message. For example, in one embodiment a calendar is consulted to determine whether or not the called party is participating in a scheduled event (in a meeting, shopping, at a social function, etc.). The calendar entry for the event may comprise the appropriate response message (e.g. "I'm in a meeting that will be ending at five o'clock. Please call back then.").

Using profiles to determine the manner in which a wireless telephone or other wireless device responds to incoming calls may reduce distractions and interruptions from incoming calls in situations where interruption is undesirable. Profiles are convenient and well-understood by large numbers of wireless telephone users. The settings of profiles may include settings for defining a response message that is provided by the wireless telephone or device, or by the network by which it communicates.

While certain features of the invention have been illustrated as described herein, many modifications, substitutions, changes and equivalents will now occur to those skilled in the art. It is, therefor, to be understood that the appended claims are intended to cover all such embodiments and changes as fall within the true spirit of the invention.

What is claimed is:

1. A wireless device comprising:
    a memory;
    a wireless communication interface in communication with the memory, the wireless communication interface for communicating with a network;
    a plurality of named profiles stored on the memory, the plurality of profiles including an active profile;
    a user input in communication with the memory; and
    a response logic stored on the memory, the response logic for detecting an incoming call,
        referencing the active profile, the active profile having a technique for communicating a response message to the incoming call,
        communicating the response message to a caller using the technique, the technique being one of a voice message, email, instant messaging, SMS, and MMS,
        receiving a wireless signal from the user input to alter the technique as a result of one of a change to the active profile and selection of a different active profile, and
        sending the wireless signal to a base station controller on the network which forwards the wireless signal to a mobile switching center storing the active profile;
    wherein the wireless signal instructs a network element on the network to intercept an incoming call from a caller, and
        determine that the response message should be sent directly to the caller without forwarding the incoming call to the wireless device.

2. The wireless device of claim 1, wherein the active profile includes response content to use in the response message.

3. The wireless device of claim 2, wherein the response logic selects response content according to a date and time.

4. The wireless device of claim 2, wherein the response logic selects response content according to an identity of the caller.

5. The wireless device of claim 1, further comprising a location.

6. The wireless device of claim 5, wherein the response logic selects response content according to a location of the wireless device.

7. The wireless device of claim 1, further comprising a display in communication with the memory.

8. The wireless device of claim 1, further comprising an antenna coupled to the wireless communication interface.

9. A system for sending a response message to a caller without forwarding an incoming call, the system comprising:
    a network;
    a network element in communication with the network;
    a wireless device in communication with the network;
    a plurality of named profiles stored on the wireless device, the plurality of profiles including an active profile; and
    a response logic stored on the network element, the response logic for detecting the incoming call,
        referencing the active profile, the active profile having a technique for communicating a response message to the incoming call,
        communicating the response message to the caller using the technique, the technique being one of a voice message, email, instant messaging, SMS, and MMS,
        receiving a wireless signal from the wireless device to alter the technique as a result of one of a change to the active profile and selection of a different active profile, and
        sending the wireless signal to a base station controller on the network which forwards the wireless signal to a mobile switching center storing the active profile;
    wherein the wireless signal instructs the network element to intercept an incoming call from a caller, and
        determine that the response message should be sent directly to the caller without forwarding the incoming call to the wireless device.

10. The system of claim 9, wherein the active profile includes response content to use in the response message.

11. The system of claim 10, wherein the response logic selects response content according to a date and time.

12. The system of claim 10, wherein the response logic selects response content according to an identity of the caller.

13. The system of claim 9, wherein the wireless device includes a location.

14. The system of claim 13, wherein the response logic selects response content according to a location of the wireless device.

15. A method for sending a response message to a caller without forwarding an incoming call to a wireless device, the caller and the wireless device on a network, the method comprising:
    detecting the incoming call;
    referencing an active profile stored on the wireless device, the active profile being one of a plurality of named profiles, the active profile having a technique for communicating a response message to the incoming call;
    communicating the response message to the caller using the technique, the technique being one of a voice message, email, instant messaging, SMS, and MMS;
    receiving a wireless signal to alter the technique as a result of one of a change to the active profile and selection of a different active profile; and
    sending the wireless signal to a base station controller on the network which forwards the wireless signal to a mobile switching center storing the active profile;
    wherein the wireless signal instructs a network element on the network to intercept an incoming call from a caller, and
        determine that the response message should be sent directly to the caller without forwarding the incoming call to the wireless device.

16. The method of claim 15, wherein the active profile includes response content to use in the response message.

17. The method of claim 16, further comprising selecting response content according to a date and time.

18. The method of claim 16, further comprising selecting response content according to an identity of the caller.

19. The method of claim 15, wherein the wireless device includes a location.

20. The method of claim 19, further comprising selecting response content according to a location of the wireless device.

* * * * *